United States Patent [19]

Ishizaka et al.

[11] Patent Number: 4,558,935

[45] Date of Patent: Dec. 17, 1985

[54] CAMERA PROVIDED WITH MEANS FOR DETECTING INFORMATION ON FILM CARTRIDGE

[75] Inventors: Sunao Ishizaka; Osamu Maida, both of Tokyo, Japan

[73] Assignee: Nippon Kogaku K. K., Tokyo, Japan

[21] Appl. No.: 613,607

[22] Filed: May 24, 1984

[30] Foreign Application Priority Data

May 30, 1983 [JP] Japan ................................. 58-95188

[51] Int. Cl.[4] ................................................ G03B 7/00
[52] U.S. Cl. .................................... 354/21; 352/78 C
[58] Field of Search ......................... 354/21; 352/78 C

[56] References Cited

U.S. PATENT DOCUMENTS

| | | | |
|---|---|---|---|
| 2,493,928 | 1/1950 | Rath | 354/21 |
| 3,492,927 | 2/1970 | Thiele et al. | 354/21 |
| 3,667,363 | 6/1972 | Tanaka | 354/21 |
| 3,669,532 | 6/1972 | Figge et al. | 352/78 C |
| 4,024,557 | 5/1977 | Aoyama et al. | 354/21 |
| 4,200,371 | 4/1980 | Suzuki et al. | 354/21 |

*Primary Examiner*—Russell E. Adams
*Attorney, Agent, or Firm*—Shapiro and Shapiro

[57] ABSTRACT

Apparatus for detecting code indicia containing electrically conductive contacts and being indicative of one or more characteristics of the film contained in the film cartridge, comprises a wall member forming a chamber for receiving the cartridge. The wall member has through-holes provided at positions opposed to the code indicia. The apparatus is further provided with a circuit substrate disposed on the side opposite to the chamber and opposed to the wall member and having thereon an electric circuit means for reading the characteristics of the film. The circuit substrate has electric terminals. The apparatus further includes electrically conductive contact members being slide-movably inserted into the respective through-holes on the wall member. Each of the contact members has two ends one of which contacts with one of the code indicia and the other end contacts with one of the electric terminals.

7 Claims, 7 Drawing Figures

CAMERA PROVIDED WITH MEANS FOR DETECTING INFORMATION ON FILM CARTRIDGE

BACKGROUND OF THE INVENTION

1. Field of the Invention

The present invention relates to an information detector adapted for a camera using a film cartridge provided with a code pattern indicative of information about the film contained in the cartridge.

2. Description of the Prior Art

In the art of photography it is known to provide a film-magazine, -cassette or -cartridge with a coding or codings indicative of information proper to the film contained therein such as film sensitivity or film speed and to read the coding by means of a detector mounted in the camera. The film information introduced into the camera through the detector is automatically stored within the camera to use it later for exposure display, exposure control or other purposes at the time of picture-taking.

As an example, U.S. Pat. No. 4,173,401 has disclosed a combination of a film cartridge having a series of laterally spaced electrically conductive contacts and a camera provided with a detector having a series of laterally spaced electrical contact pins cooperating with the contacts. In this prior art film-information detecting means, the contacts arranged on the cartridge are partly covered with a coating of electrically insulating material to render the contacts partly electrically non-conductive to the contact pins. Thus, there is formed a pattern of conductive and non-conductive portions which constitutes a digital code indicative of the above-mentioned film information.

The information picked up by the contact pins is introduced into an electric circuit within the camera. In the circuit, the information is decoded and then stored in the camera. The film information stored within the camera in this manner is to be used to determine the exposure value when a picture is taken using the film. Since the stored information is a determinative factor to optimum exposure, it is absolutely necessary for such film information to be correctly transmitted to the electric circuit from the pins without fail. Otherwise the picture-taking will result in failure from the first frame to the last of the film. Main factors disturbing the correct transmission of the film information are bad contacts between electrical parts and the effects of electrical noise as generated by other electrical apparatus and instruments mounted in the camera. The frequency of wrong transmission of film information caused by these factors increases with increasing of the number of electric parts and also with increasing of the length of electric wiring. Thereby the reliability of the camera is reduced greatly.

SUMMARY OF THE INVENTION

Accordingly it is an object of the invention to provide an improved information detector with high reliability.

It is another object of the invention to provide an information detector having an information input part comprising contact pins which contact with contacts on a film cartridge at one ends and the other ends of which are in direct contact with electric terminals on a circuit substrate on which an electric circuit has been formed.

Other and further objects, features and advantages of the invention will appear more fully from the following description taken in connection with the accompanying drawings.

BRIEF DESCRIPTION OF THE DRAWINGS

FIG. 3 shows a second embodiment of the present invention, in which

FIG. 4 shows a third embodiment of the invention, in which

DESCRIPTION OF PREFERRED EMBODIMENTS

Figure 1:
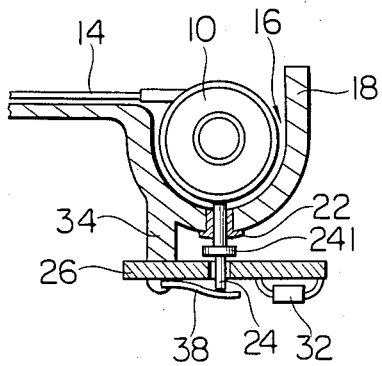
FIG. 1 is a sectional view of a detector showing a first embodiment of the present invention.
Figure 2:
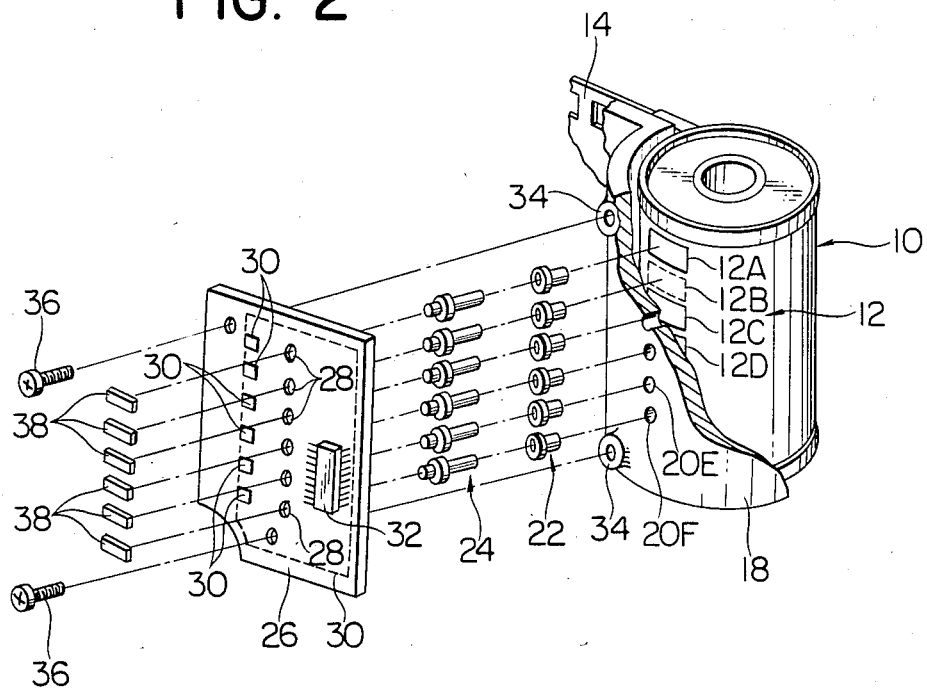
FIG. 2 is an exploded perspective view of the first embodiment.

A first embodiment of the invention is shown in FIGS. 1 and 2. Designated by 10 is a film cartridge made of metal and coated with an electrically insulating material. The insulating covercoat is partly removed from the metal cartridge so as to form contacts 12 by the exposed electrically conductive surface of the cartridge. As seen best in FIG. 2, the electrically conductive contacts 12 are arranged in a row on the outer wall surface of the film cartridge 10. The portion 12B indicated by a broken line is an electrically non-conductive portion at which the insulating covercoat remains unremoved. The electrically conductive contacts (12A, 12C . . . ) and the electrically non-conductive portion(s) (12B) in combination constitute 6-bit digital code indicia indicative of various information about the film 14 contained in the cartridge 10. The film information may be, for example, film speed, number of exposures and latitude.

The film cartridge 10 is received in a film chamber 16 formed by a wall 18 of a camera. The wall 18 has six through-holes 20 arranged correspondingly to the digital code indicia on the cartridge. Insulating bushes 22 are fitted into the through-holes 20. The bushes 22 are made of an elastic insulating material and have center holes. Designated by 24 are electrically conductive contact pins each of which has a larger-diameter flange 241 at the middle of the pin. At one end, the contact pins electrically contact with the contacts 12 on the film cartridge 10. The other ends of the respective contact pins 24 pass through six through-holes 28 in a row formed in a circuit substrate 26 and project on the other side of the substrate 26.

The substrate 26 is formed of an electrically insulative hard material. Within a circuit pattern area 30 on the surface of the substrate there are provided six electric terminals 30 arrayed in a row along the six through-holes 28, an IC block 32 for reading and processing the digital code, and a network for electrical connection between the terminals 30 and IC block 32. Other processing circuits such as an exposure control circuit and display control circuits also may be provided in the area 30. The IC block 32 may be one that functions as a decoder and that is able to perform not only the conversion of binary-coded film information into grey code and the processing of the information for its use in the exposure control circuit etc. but also the processing of other information signals for picture-taking (such as shutter speed and diaphragm opening) and the control of display and exposure.

The circuit substrate 26 is fixed to the wall 18 of the film chamber by bolts 36 screwed into bosses formed on the wall. The other ends of the contact pins 24 projecting from the opposite side of the substrate are in contact with electrically conductive leaf springs 38 one ends of which are fixed to the electric terminals 30 by soldering or other means. Each of the leaf springs 38 biases a corresponding one of the contact pins 24 toward the film chamber 16. With the above structure, film information is transmitted from the contacts 12 on the film cartridge to the electric terminals 30 through the contact pins 24 and leaf springs 38, and then transmitted to the IC block 32 through the network on the circuit substrate. Therefore, it is no longer necessary to provide particular wiring of leads between the contact pins 24 and the network on the substrate. The film information can be transmitted to the circuit on the substrate over the shortest distance. The contact pins 24 and the leaf springs 38 biasing the pins are firmly held by the circuit substrate so that good contact is always assured between the contact pins and the code indicia on the cartridge. Also, the electrically insulating bushes 22 serve to prevent light from entering the interior of the camera through the through-holes 20 on the film chamber when the back lid of the camera is opened. Therefore, there is no possibility that processing circuits within the camera, such as the IC block, may be electrically adversely affected by light. In case that the film chamber wall 18 is formed of an electrically non-conductive material such as plastics, it is unnecessary for the bushes to be electrically insulative.

Figure 3A:
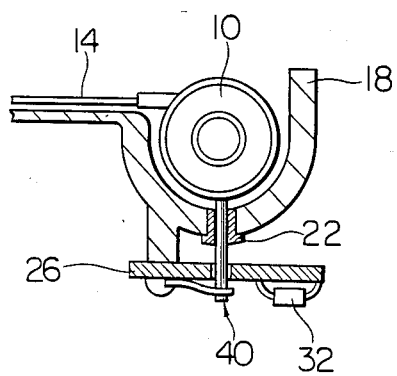
FIG. 3A is a sectional view thereof and FIG. 3B is a perspective view of the essential part thereof.
Figure 3B:
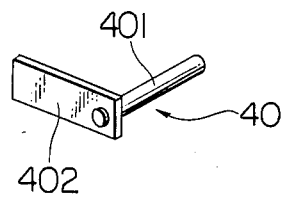

Each contact pin and the corresponding leaf spring can be formed as a unitary contact member. FIGS. 3A and 3B show a form of such a unitary contact member 40 comprising a contact pin 401 and a leaf spring 402 united together. The contact pin 401 and the leaf spring 402 may be welded together by soldering or may be formed from one and the same piece of metal by bending.

Figure 4A:
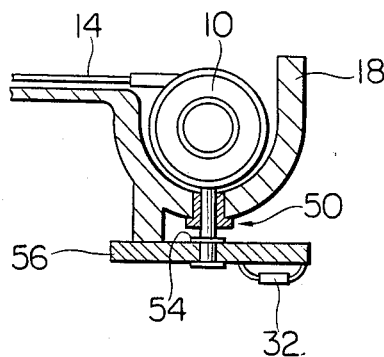
FIG. 4A is a sectional view thereof and FIG. 4B is a perspective view of the essential part thereof.
Figure 4B:
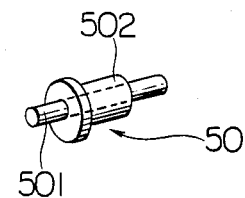

FIGS. 4A and 4B show another embodiment according to which the number of steps of the assembling process as well as the number of parts required for the information detector can be substantially reduced. In this embodiment, contact members 50 are inserted into the through-holes 20 formed in the film chamber wall 18. One of the contact members 50 is shown in FIG. 4B in perspective view. The contact member 50 is composed of an elastic and electrically conductive pin 501 and an elastic and electrically insulative bush 502 partly surrounding the center pin 501. 56 is a circuit substrate which is fixed to the wall 18 in the same manner as in the first embodiment. On the backside surface of the substrate 56 facing the film chamber there are provided six electric terminals 54 only one of which is seen in FIG. 4A. The terminals 54 are electrically connected to the circuit network and IC block 32 provided on the front surface of the substrate 56 through through-holes. Since the pin-like elastic member 501 formed of an electrically conductive material such as carbon system material and the bush-like elastic and electrically insulative member 502 are united together into the unitary contact member 50, the structure of this embodiment is very simple. Preferably both of the elastic members 501 and 502 are formed of materials on silicone rubber base.

Figure 5:
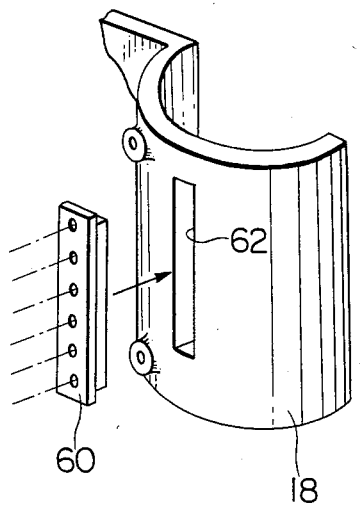
FIG. 5 is an exploded perspective view of the essential part of a detector in a fourth embodiment of the invention.

FIG. 5 shows a further embodiment of the invention. In this embodiment, a rectangular bush 60 is used. The bush 60 has six holes into which the contact pins 24 or 40 are inserted. The film chamber wall 18 has a slot 62 for receiving the rectangular bush 60.

We claim:
1. In a camera which can use a film cartridge having code indicia containing electrically conductive contacts and being indicative of one or more characteristics of the film contained in the cartridge, apparatus for detecting said code indicia comprising:
(a) a wall member forming a chamber for receiving said cartridge, said wall member having through-holes provided at positions opposed to said code indicia;
(b) a circuit substrate fixed to said wall member at a side of said wall member opposite to said chamber and having thereon an electric circuit means for reading the characteristics of said film, said circuit substrate having through-holes corresponding to said through-holes on the wall member, and having electric terminals arranged on a surface of said circuit substrate at a side thereof opposite to the wall member, said circuit substrate being formed of an electrically insulative material sufficiently hard to keep a positional relation with said wall member;
(c) electrically conductive contact pin members slidably inserted in respective through-holes on said wall member and respective through-holes on said circuit substrate, each of said contact pin members having two ends one of which is in contact with one of said code indicia and the other of which projects from said opposite side surface of the circuit substrate; and
(d) electrically conductive spring members biasing said contact pin members toward said chamber, each of said spring members having two ends one of which is fixed to one of said electric terminals and the other of which is in contact with the other end of a corresponding contact pin member.

2. An apparatus according to claim 1, wherein said other end of said each spring member is fixed to said other end of the corresponding contact pin member.

3. An apparatus according to claim 1, wherein each of said spring members is a leaf spring.

4. An apparatus according to claim 1, further comprising elastic bush members in said through-holes of said wall member, respectively.

5. In a camera which can use a film cartridge having code indicia containing electrically conductive contacts and being indicative of one or more characteristics of the film contained in the cartridge, apparatus for detecting said code indicia comprising:
(a) a wall member forming a chamber for receiving said cartridge, said wall member having through-holes provided at positions opposed to said code indicia;
(b) a circuit substrate fixed to said wall member at a side of said wall member opposite to said chamber and having thereon an electric circuit means for reading the characteristics of said film, said circuit substrate having through-holes corresponding to said through-holes on the wall member, and having electric terminals passing through respective through-holes from a surface of said circuit substrate at a side thereof opposite to the wall member to a surface facing the wall member, and said circuit substrate being formed of an electrically insulative material sufficiently hard to keep a positional relation with said wall member; and (c) electrically conductive contact pin members inserted in respective through-holes on said wall member, each of said contact pin members having two ends one of which is in contact with one of said code indicia and the other of which is in contact with one of said electric terminals, each of said contact pin members being composed of an elastic material.

6. In a camera which can use a film cartridge having code indicia containing electrically conductive contacts and being indicative of one or more characteristics of the film contained in the cartridge, apparatus for detecting said code indicia comprising:

(a) a wall member forming a chamber for receiving said cartridge, said wall member having an opening provided at a position opposed to said code indicia;

(b) a bush member in said opening and having through-holes;

(c) a circuit substrate fixed to said wall member at a side of said wall member opposite to said chamber and having thereon an electric circuit means for reading the characteristics of said film, said circuit substrate having through-holes corresponding to said through-holes on the bush member, and having electric terminals arranged on a surface of said circuit substrate at a side thereof opposite to the wall member, said circuit substrate being formed of an electrically insulative material sufficiently hard to keep a positional relation with said wall member;

(d) electrically conductive contact pin members slidably inserted in respective through-holes on said bush member and respective through-holes on said circuit substrate, each of said contact pin members having two ends one of which is in contact with one of said code indicia and the other of which projects from said opposite side surface of the circuit substrate; and (e) electrically conductive spring members biasing said contact pin members toward said chamber, each of said spring members having two ends one of which is fixed to one of said electric terminals and the other of which is in contact with the other end of a corresponding contact pin member.

7. An apparatus according to claim 6, wherein each of said spring members is a leaf spring.

* * * * *